United States Patent Office.

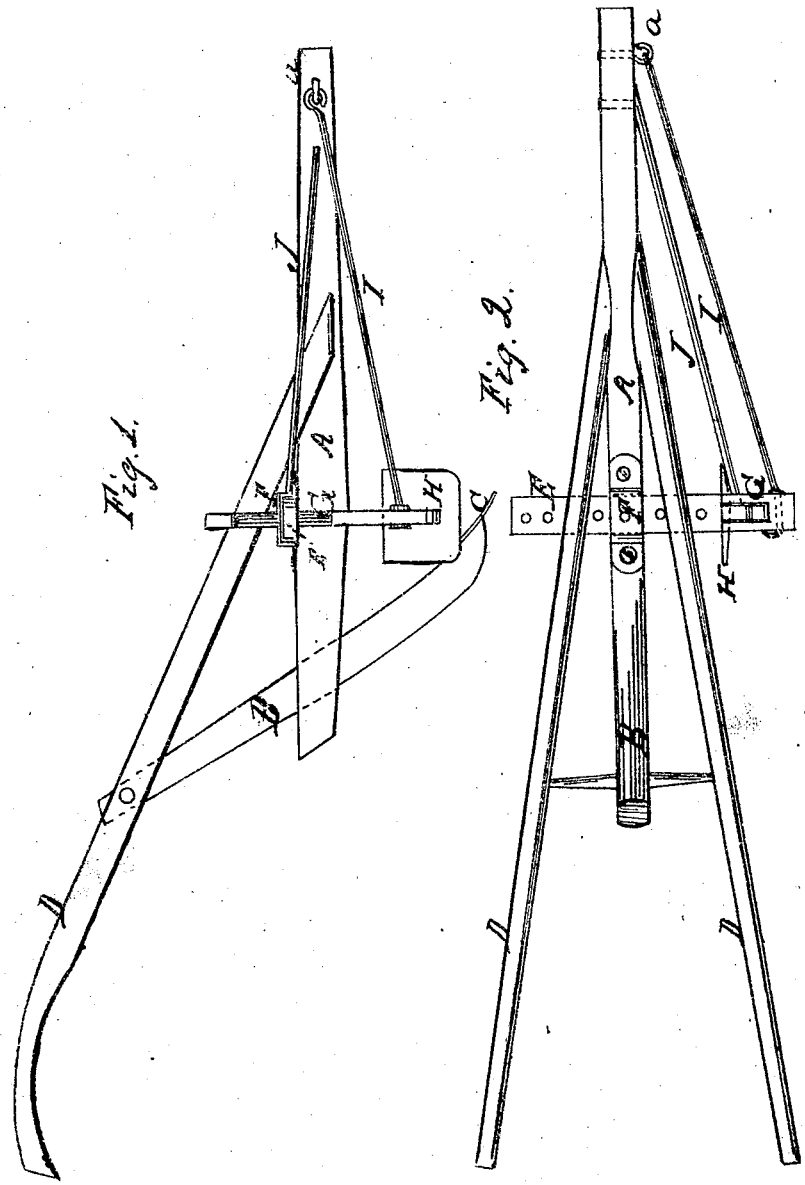

WILLIAM BENNETT, OF RUSHVILLE, INDIANA.

Letters Patent No. 73,158, dated January 7, 1868.

IMPROVEMENT IN ATTACHMENT FOR PLOUGHS.

The Schedule referred to in these Letters Patent and making part of the same.

TO ALL WHOM IT MAY CONCERN:

Be it known that I, WILLIAM BENNETT, of Rushville, in the county of Rush, and State of Indiana, have invented a new and improved Attachment for Ploughs; and I do hereby declare that the following is a full and exact description thereof, which will enable others skilled in the art to make and use the same, reference being had to the accompanying drawings, and to the letters of reference marked thereon.

This invention relates to a new and useful attachment for corn or cultivator-ploughs, for the purpose of preventing the mould-board or share from casting clods of earth upon the plants during the process of ploughing the same. In the accompanying sheet of drawings—

Figure 1 is a side view of a plough having my improvement applied to it.

Figure 2, a plan or top view of the same.

Similar letters of reference indicate like parts.

A represents the beam of the plough, B the standard, C the share, and D the handles thereof. These parts may be constructed in the usual way, and therefore do not require a special description. Transversely on the beam A there is placed a sliding bar, E, which works in a socket, F, the latter, as well as the sliding bar, being of metal; that, at least, would be the preferable material. The bar E is allowed to slide or work freely in the socket F, and in one end of said bar there is fitted a pendent bar, G, having a plate or fender, H, secured to its lower end. This pendent bar G is secured in the bar E by means of a wedge or other means, which will admit of the bar G and fender H being adjusted higher or lower, as may be desired, to suit the height of the plough to which they may be applied. The fender H is at one side of the share C, a short distance from it, and the bar E is braced from the front of the beam A by a rod, I, and also braced by another rod, J, which serves as a spring as well as a brace, in consequence of being attached rigidly to the beam, instead of by a joint, $a$, as the rod I.

As the plough is drawn along the row of plants, with the fender H between the latter and the share C, the fender prevents the share from throwing clods of earth upon the plants; and in case of a heavy clod striking, it yields or gives, being forced outward, owing to its attachment to the sliding-bar E; the spring J throwing the fender back to its original position after it has passed the clod. This yielding movement of the fender prevents it from injury, causes the plough to run steadier than it otherwise would, while it protects the plants from clods of earth equally as well as the rigid fenders hitherto used.

I do not claim broadly the application of a fender to a plough, for they have been previously used; but I do claim as new, and desire to secure by Letters Patent—

1. The vertically-adjustable fender H, attached to the bar E, sliding in the guide F, when such bar is attached to the spring J, whose forward end is secured to the beam A in such a manner that the fender shall yield to a clod of earth, and be thrown into the proper position by the spring J, after passing such clod, as herein shown and described, for the purpose specified.

2. The spring J, when secured to the sliding bar E, bearing the pendent arm G and fender H, for the purpose of allowing a yielding movement to the fender when brought in contact with clods of earth, as herein shown and described.

WILLIAM BENNETT.

Witnesses:
LEVI H. STEPHENS,
F. M. BENNETT.